United States Patent [19]

Iijima

[11] Patent Number: 4,837,706

[45] Date of Patent: Jun. 6, 1989

[54] DRAWING PROCESSING APPARATUS

[75] Inventor: Kenji Iijima, Kobe, Japan

[73] Assignee: Mitsubishi Denki Kabushiki Kaisha, Tokyo, Japan

[21] Appl. No.: 918,823

[22] PCT Filed: Feb. 28, 1986

[86] PCT No.: PCT/JP86/00098

§ 371 Date: Aug. 18, 1986

§ 102(e) Date: Aug. 18, 1986

[87] PCT Pub. No.: WO86/05297

PCT Pub. Date: Sep. 12, 1986

[30] Foreign Application Priority Data

Feb. 28, 1985 [JP] Japan .................. 60-39817

[51] Int. Cl.⁴ .................................. G06F 15/626
[52] U.S. Cl. ...................... 364/518; 340/721
[58] Field of Search ............... 364/518, 521, 488, 512, 364/522, 523, 571; 340/724, 286 M, 721

[56] References Cited

U.S. PATENT DOCUMENTS

| | | | |
|---|---|---|---|
| 3,596,068 | 7/1971 | Doyle | 364/518 |
| 3,867,616 | 2/1975 | Korelitz et al. | 364/512 |
| 4,412,296 | 10/1983 | Taylor | 364/521 |
| 4,627,015 | 12/1986 | Stephens | 364/521 |
| 4,661,811 | 4/1987 | Gray et al. | 340/744 |
| 4,710,885 | 12/1987 | Litteken | 364/518 |
| 4,747,074 | 5/1988 | Yoshida | 364/900 |

FOREIGN PATENT DOCUMENTS

| | | |
|---|---|---|
| 47388 | 3/1982 | European Pat. Off. . |
| 57-143672 | 9/1982 | Japan . |
| 57-197673 | 12/1982 | Japan . |
| 58-159110 | 9/1983 | Japan . |
| 239823A | 11/1985 | Japan .................. 364/521 |

OTHER PUBLICATIONS

Tokyo Shibaura Denki K. K., Patent Abstracts of Japan, vol. 6, No. 162, p. 137, Aug. 25, 1982.
A. J. Shils, IBM Technical Disclosure Bulletin, vol. 14, No. 10, "Dimension Generator", Mar. 10, 1972, pp. 3001–3002.
Mitsubishi Electric Corp. Catalogue, "An Outline of Mitsubishi MELCAD-MD", 1983, pp. 1–16.

Primary Examiner—Gary V. Harkcom
Assistant Examiner—Phu K. Nguyen
Attorney, Agent, or Firm—Bernard, Rothwell & Brown

[57] ABSTRACT

A drawing processing apparatus to be used in various fields of industry for making such drawings as a distribution line drawing and more particularly drawing processing apparatus utilizing a computer. The apparatus includes a program for automatically determining, from data of kinds and positions of symbols of a first kind and data of contents of symbols for qualifying the symbols of the first kind and the condition of 'qualifying/to be qualified', the positions in which the symbols of the second kind are to be drawn, whereby the positions of the symbols for qualifying the symbols whose positions to be drawn therein are singularly determined, i.e., of the symbols of the second kind, are determined. Thus, by the automatic determination of the positions for drawing the symbols of the second kind therein, the work for the operator to input these data of positions for describing the symbols of the second kind therein can be eliminated.

6 Claims, 5 Drawing Sheets

SHIFTING PATTERN OF CHARACTER STRINGS FOR ELECTRIC POLES

DRAWING PROCESSING APPARATUS OPERATIONAL FLOW CHART

SHIFTING PATTERN OF CHARACTER STRINGS FOR DISTRIBUTION LINES

DRAWING PROCESSING APPARATUS

BACKGROUND OF THE INVENTION

1. Field Of The Invention

The present invention relates to a drawing processing apparatus to be used in various fields of industry for making drawings such as a distribution line drawing and more particularly to a drawing processing apparatus utilizing a computer.

2. Description Of The Prior Art

In various fields of industry, various drawings such as system arrangement drawings are used, for example, distribution line drawings, are used in the field of electric power industry. FIG. 7 indicates a portion of such a distribution line drawing, in which 1A and 1B denote electric pole symbols, 2A, 2B, and 2C denote distribution line symbols, 3A and 3B denote character strings stating electric pole specifications, and 4A, 4B, and 4C denote character strings stating distribution line specifications.

The positions wherein symbols of the first kind consisting of the electric pole symbols 1A, 1B and the distribution line symbols 2A, 2B, 2C are to be drawn are fixedly determined in correspondence with the erected positions of the electric poles.

The character strings 3A, 3B stating the electric pole specifications and the character strings 4A, 4B, 4C stating the distribution line specifications are symbols of the second kind for qualifying or defining the symbols of the first kind consisting of the electric poly symbols 1A, 1B and the distribution line symbols 2A, 2B, 2C whose positions to be drawn therein are determined, and the same must be drawn in the vicinity of the symbols to be qualified but so as not to overlap with other character strings or symbols.

As a drawing processing apparatus for making such a drawing, there has so far been known a so-called CAD system using a computer as shown, for example, in a document: Mitsubishi Electric Corporation Catalog NM-LF01-09A<39C0>. When this system is applied to making a distribution line drawing, apparatus such as shown in FIG. 8 is employed. In FIG. 8, 5 denotes a computer, 6A denotes a storage device storing data of kinds and positions of facilities consisting of data of kinds and positions of electric poles as well as kinds of distribution lines and their connections, 6B denotes a storage device storing data of facilities specifications consisting of data of electric poles specifications and distribution lines specifications, 6c denotes a storage device storing data of positions in which facilities specifications are to be drawn, 7 denotes an interactive input-/output device for the operator, and 8 denotes a printer for outputting drawings.

The operations will be described in the following.

The operator inputs, through the interactive input-/output device 7, data of kinds and positions of facilities, data of facilities specifications, and data of positions in which facilities specifications are to be drawn. These input data are stored in the storage devices 6A, 6B, 6C, respectively, under the control of the computer 5. Then, under the control of the computer 5, the facilities are drawn from the data of kinds and positions of facilities stored in the storage device 6A, the facilities specifications are drawn from the data of facilatates specifications and data of positions in which facilities specifications are to be drawn stored in the storage devices 6B, 6C and a drawing is output to the printer 8.

Since the prior art apparatus has been structured as described above, the operator has had to input the data of the positions for drawing therein of the character strings stating facilities specification, i.e. the positions of the symbols of the second kind qualifying the symbols of the first kind are individually determined by the operator, and therefore, it took a long time to input so much data.

SUMMARY OF THE INVENTION

The present invention was directed to solve the problem as described above, and therefore has a primary object to provide a drawing processing apparatus capable of making a drawing without having the operator input the drawing positions for the symbols of the second kind for qualifying the symbols of the first kind by automatically determinging the positions in the drawing for the symbols of the second kind from the data of the symbols of the first kind whose positions to be drawn therein are individually determined.

DESCRIPTION OF THE PREFERRED EMBODIMENTS

Figure 1:
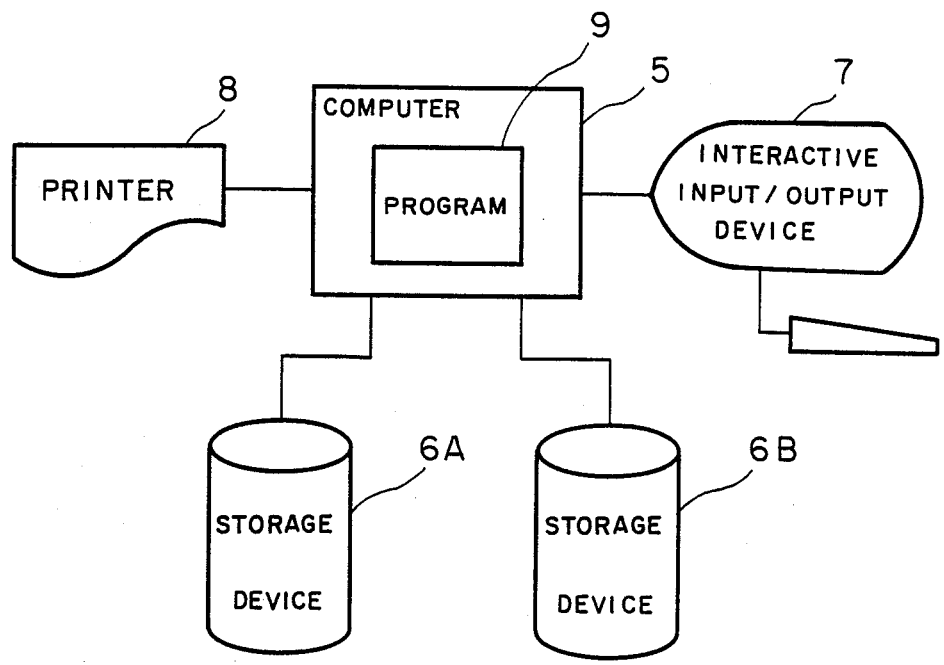
FIG. 1 is a block diagram showing a drawing processing apparatus according to one embodiment of the present invention.

The present invention will be described below taking the distribution line drawing as an example, the same as in the description of the prior art. FIG. 1 shows one embodiment of the present invention. Referring to FIG. 1, 9 denotes a program for determining the positions in a drawing for facilities specifications from data of the kinds and the positions of facilities and from data of the facilities specifications.

Figure 8:
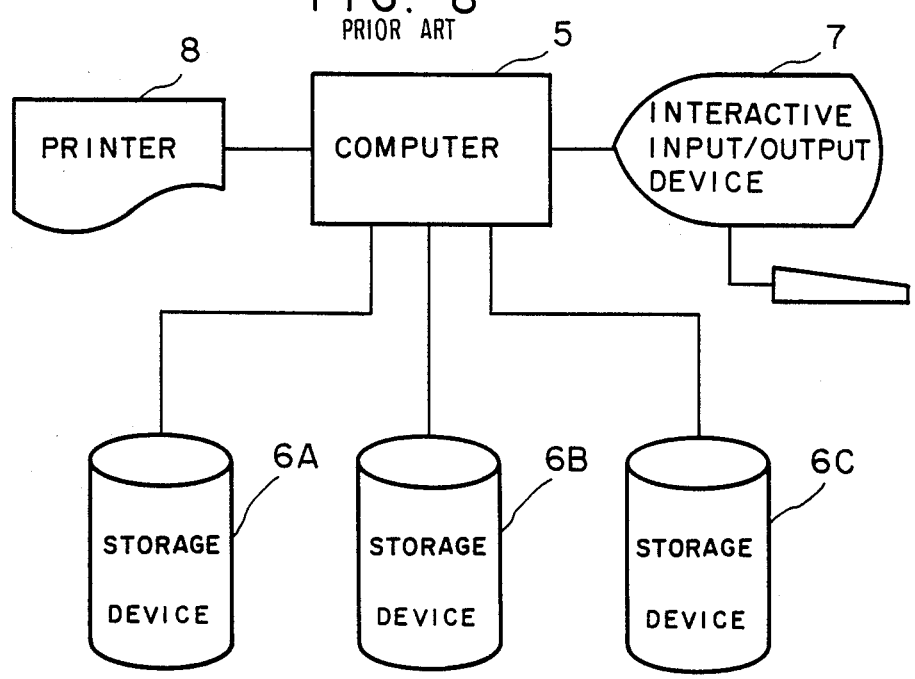
FIG. 8 is a block diagram showing an example of drawing processing apparatuses of the prior art.

Other than that, like reference numerals in FIG. 1 to those in FIG. 8 denote like or corresponding parts.

The operations will be described below.

The operator inputs data of kinds and positions of facilities and inputs data of facilities specifications into the drawing processing apparatus using the interactive input/output device 7. These input data are stored in the storage devices 6A and 6B, respectively, under the control of the computer 5. Then, under the control of the computer 5, symbols for the facilities are drawn by the printer 8 from the stored data of the kinds and the positions of the facilities and, at the same time, the program 9 is executed, whereby non-overlapping positions for drawing the facilities specifications are determined, and the facilities specifications are drawn by the printer 8 along with the symbols of the facilities.

The operations of the program 9 will be described in detail in the following.

Figure 4:
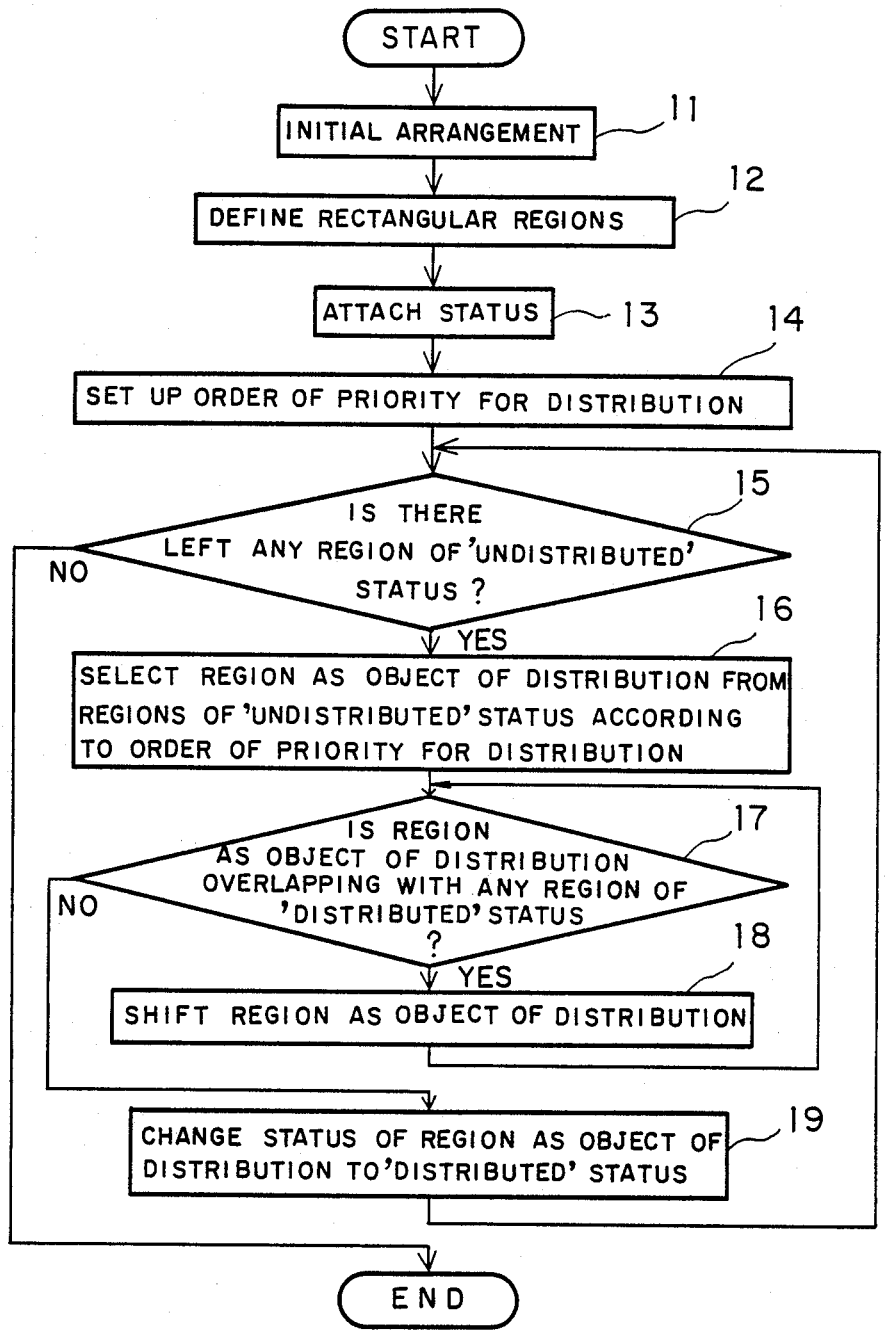
FIG. 4 is a flow chart showing an example of functions and operational flow of the present invention.

Functions and operational flow of the present invention are shown in FIG. 4.

[1] The positions of the symbols stating the facilities specifications are temporarily designated individually at a respective predetermined position relative to the symbols of the corresponding facilities to be defined. (Step 11)

Figure 2:
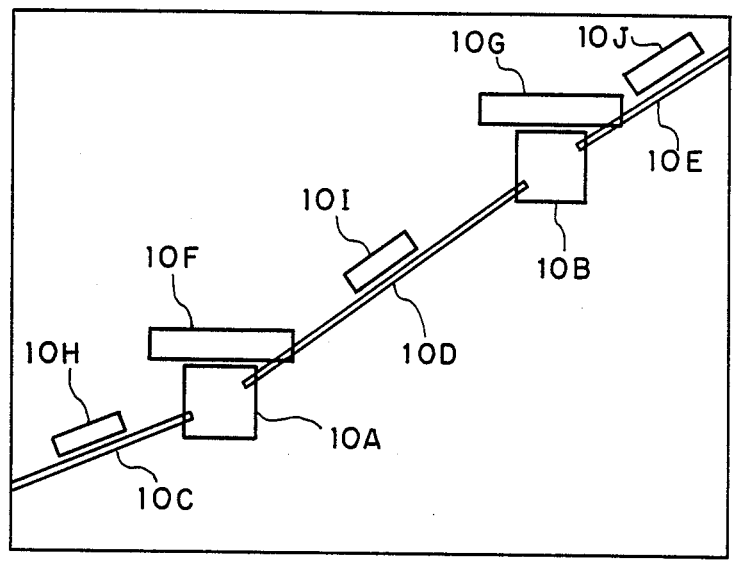
FIGS. 2 and 3 are explanatory drawings of the operations of the above embodiment.

[2] With both the symbols stating the facilities and the symbols stating the facilities specifications occupying rectangular regions, data defining such rectangular regions are made. Examples of the rectangular regional data in a temporarily distributed state are shown in FIG. 2. Referring to FIG. 2, 10A–10E denote the regions which the symbols stating the facilities occupy and 10F–10J denote the regions which the symbols stating the facilities specifications occupy. By the way, FIG. 2 corresponds to the intitial arrangement of the distribution line drawing of FIG. 7. (Step 12)

[3] A 'distributed' status is attached to the regions of the symbols stating the facilities and an 'undistributed' status is attached to the regions of the symbols stating the facilities specifications. (Step 13)

[4] The order or priority for distribution is set up according to the kind of the facilities specifications (whether electric poles specifications or distribution lines specifications). (Step 14)

[5] The processes 5-1, 5-2, and 5-3 are performed as long as there is left any region of the 'undistributed' status. (If there is no region of the 'undistributed' status, the execution of the program 9 is ended.) (Step 15)

[5-1] Out of the regions of the 'undistributed ' status, one of the regions of the symbols stating facility specifications of higher order of priority for distribution is selected and this is made to be the region as the object of distribution. (Step 16)

[5-2] It is checked whether or not the region as the object of distribution is overlapping with another region of the 'distributed' status and the process of 5-2-1 is performed until there remains no overlap (if there is no overlap, the process 5-3 is then processed). (Step 17)

[5-2-1] The region as the object of distribution is shifted or moved to a new position. The direction and distance of the shifting, or the new position, is determined from a sequential pattern (FIGS. 5 or 6) or list of new relative positions according to the kind of the facilities specifications and the number of times of checking for the overlapping of the region as the object of distribution performed in the above mentioned process 5-2. For example, in the case where the number of times of the checking is small, the region for distribution is shifted in the vicinity of the symbol of the facility to be qualified, and if the number of times of the checking is increasing because of difficulty in distributing the region as the object of distribution without producing any overlap, the distance of the shifting is increased, and so on. (Step 18)

[5-3] The status of the region as the object of distribution is changed from 'undistributed' to distributed'. Namely, the distribution of the region as the object of distribution selected in the above mentioned process 5-1 is finished. (Step 19)

The above is the description of the operations of the program 9.

Figure 3:
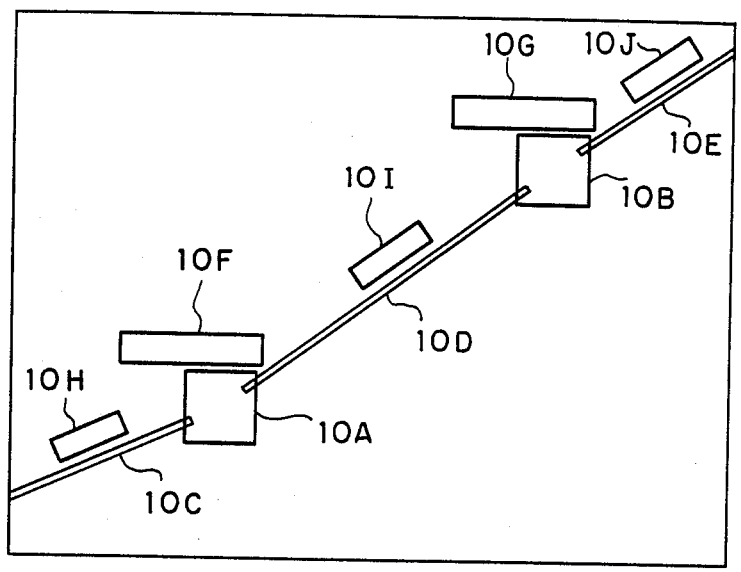
Figure 5:
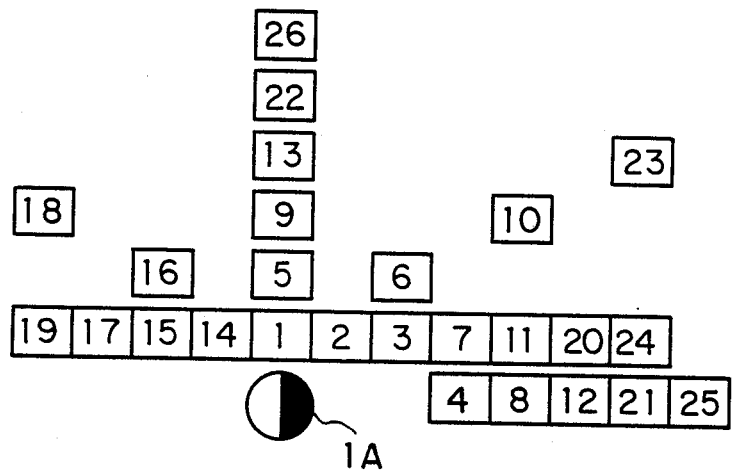
FIGS. 5 and 6 are drawings showing examples of patterns of shifting of regions as the objects of distribution.
Figure 6:
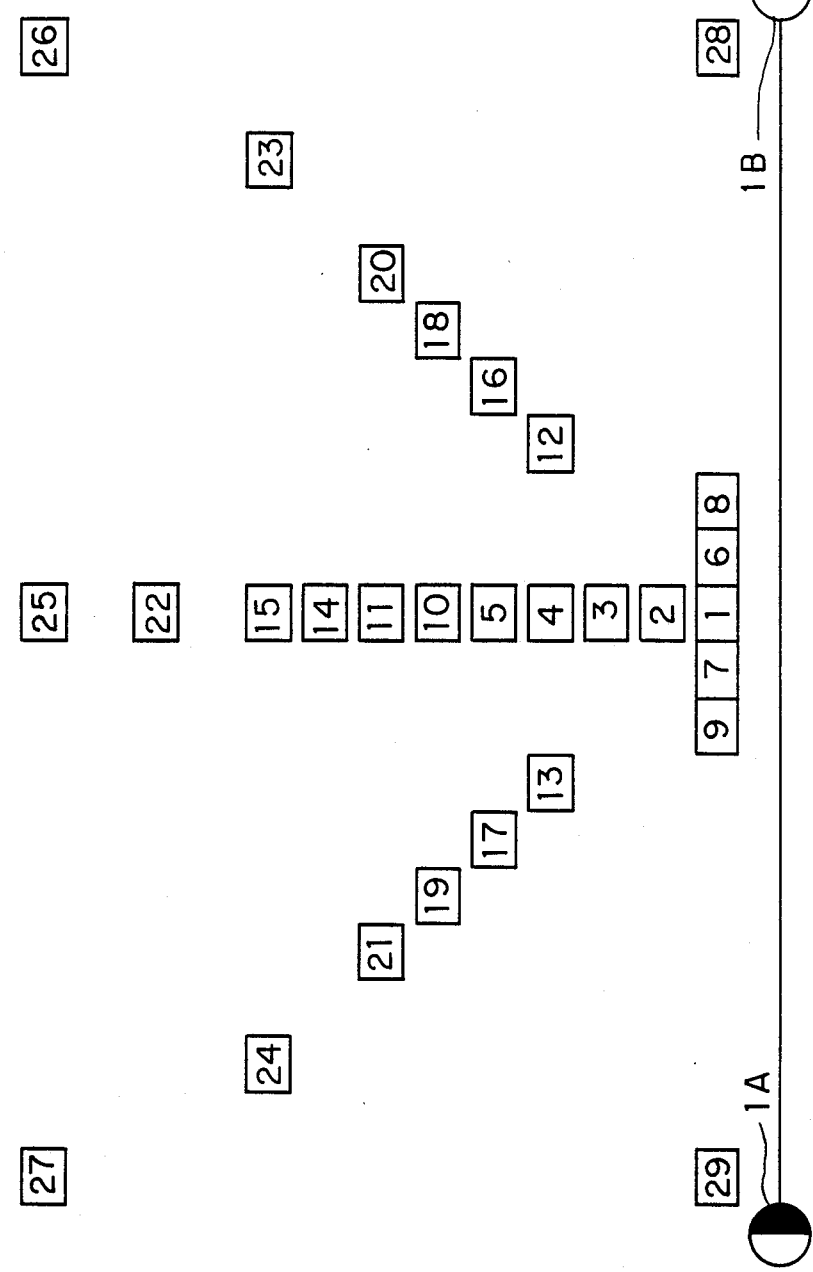
Figure 7:
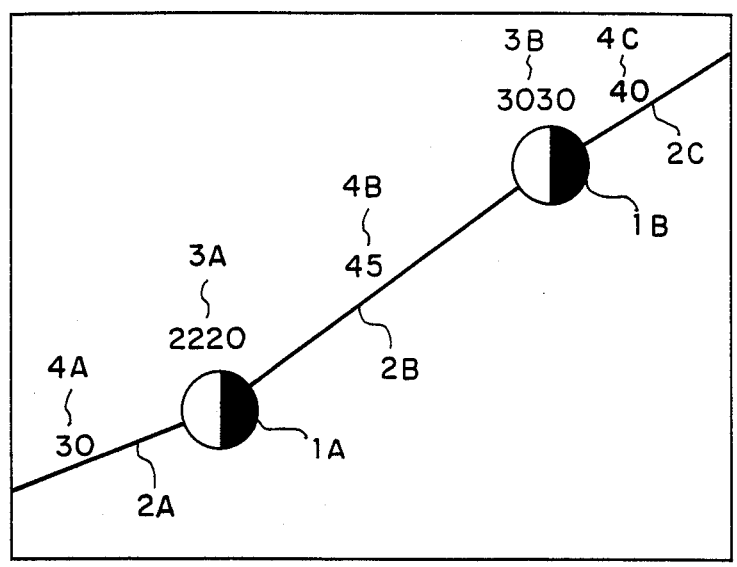
FIG. 7 is an explanatory drawing showing an example of making a drawing.

The example of the regional data which have gone through with the operations of the program 9 is shown in FIG. 3. In FIG. 3, the regions 10F, 10G which had overlaps in the temporarily distributed state have been shifted and the overlaps have been eliminated. By having the symbols of the facilities and the symbols stating the facilities specifications drawn according to the regional data in FIG. 3, the distribution line drawing of FIG. 7 is obtained. The patterns of shifting or sequential positions in the process 5-2-1 are shown in FIGS. 5 and 6.

Although, in the above described embodiment, the drawing was made with the positions for drawing the facility specifications therein determined automatically, the symbols whose positions to be drawn therein are fixedly determined (the symbols of the first kind) and the symbols qualifying the same whose positions to be drawn therein are arbitrarily determined (the symbols of the second kind) may be connected by leader lines whereby their correspondence with each other is made distinct. It may also be practicable to connect the symbols of the first kind and the symbols of the second kind to make their correspondence distinct only when the distances between them are longer.

In the present case, the distribution line drawing was taken as the example, but the present invention can be applied to any of such drawings as machine drawings, piping drawings, and the like, if the drawing is such that symbols whose positions to be drawn therein are fixedly determined and symbols qualifying the same and the positions thereof wherein the same are to be drawn are arbitrarily determined.

As described so far, the present invention is provided with a program automatically determining the positions for drawing therein the symbols which qualify the symbols whose positions to be drawn therein are singularly determined from the data of kinds and drawn positions of the symbols whose positions to be drawn therein are singularly determined and the data of the contents of the symbols qualifying these symbols and the condition of 'qualifying / to be qualified', and therefore, such an effect is obtained that a drawing can be made without the need for the operator to input the symbols whose positions to be drawn therein are singularly determined.

By the way, the functions and operational flow as shown in FIG. 4 are fully performed by the computer unit shown in FIG. 1, and therefore, each means for performing each of the steps 11–19 of FIG. 4 exists in the computer unit shown in FIG. 1. That is, each of the steps 11–19 in FIG. 4 can be read as each of the means 11–19.

The present invention is applicable to an apparatus to process such a drawing as a distribution line drawing utilizing a computer.

What is claimed is:

1. A drawing processing apparatus for making a drawing consisting of a plurality of symbols of a first kind whose positions in the drawing are fixedly determined, and a plurality of symbols of a second kind whose positions in the drawing are arbitrarily determined within respective predetermined ranges in correspondence with the symbols of the first kind for defining the respective symbols of the first kind, said drawing processing apparatus comprising:

assignment designation means for assigning respective rectangular regions of predetermined dimensions on the face of the drawing to all of said symbols of the first and second kinds;

temporary distribution designation means for designating positions of said rectangular regions of the symbols of the first kind at the corresponding fixed positions, and for temporarily designating positions of said rectangular regions of the symbols of the second kind at first selected positions in the predetermined ranges relative to the respective symbols of the first kind on the face of the drawing; and adjustment means for determining an overlapped portion of each of said rectangular regions of the symbols of the second kind temporarily distributed over the face of the drawing on another rectangular region and for automatically changing the designated positions of said rectangular regions to second positions within respective predetermined ranges so as to eliminate the overlapping thereby to finally determine the distribution of the rectangular regions such that, after the distribution has been finished, the symbols corresponding to respective rectangular regions are suitable for employment in the drawing.

2. A drawing processing apparatus according to claim 1, wherein said drawing consisting of the symbols of the first and second kinds is a distribution line drawing.

3. A drawing processing apparatus according to claim 2 wherein the symbols of the first kind include symbols of electric poles and symbols of electric distribution lines, the symbols of the second kind include character strings stating electric pole specifications and character strings stating electric distribution line specifications, the adjustment means includes means for sequentially selecting subsequent positions in a predetermined shifting pattern of more than three different positions within the respective predetermined range until absence of any overlapping portion is determined, and the predetermined shifting pattern of positions for character strings stating electric pole specifications is different from the predetermined shifting pattern of positions for character strings stating electric distribution line specifications.

4. A drawing processing apparatus according to claim 3 wherein the temporary distribution designation means designates symbols of the first kinds as distributed and designates symbols of the second kind as undistributed, and the adjustment means determines a portion of an undistributed symbol overlapped on a distributed symbol to move the undistributed symbol to the next position in the case of an overlap and to designate the undistributed symbol as distributed in the case of no overlap.

5. A drawing processing apparatus according to claim 1 wherein the adjustment means includes means for sequentially selecting subsequent positions in a predetermined shifting pattern of more than three different positions within the respective predetermined range until absence of any overlapping portion id determined.

6. A drawing processing apparatus according to claim 5 wherein the temporary distribution designation means designates symbols of the first kind as distributed and designates symbols of the second kind as undistributed, and the adjustment means determines a portion of an undistributed symbol overlapped on a distributed symbol to move the undistributed symbol to the next position in the case of an overlap and to designate the undistributed symbol as distributed in the case of no overlap.

* * * * *

UNITED STATES PATENT AND TRADEMARK OFFICE
CERTIFICATE OF CORRECTION

PATENT NO. : 4,837,706

DATED : June 6, 1989

INVENTOR(S) : Kenji Iijima

It is certified that error appears in the above-identified patent and that said Letters Patent is hereby corrected as shown below:

Column 1, line 32, "poly" should be --pole--.

Column 3, line 59, insert a quotation mark --'-- before the word "distributed". (first occurrence)

Column 4, line 19, "longer" should be --larger--.

Column 6, line 21, "id" should be --is--.

Signed and Sealed this

Fourteenth Day of August, 1990

Attest:

HARRY F. MANBECK, JR.

*Attesting Officer*  *Commissioner of Patents and Trademarks*